3,594,312
HYDRODESULFURIZATION PROCESS UTILIZING A CATALYST PROMOTED WITH AN ALKALI METAL
Robert D. Christman, Penn Hills Township, and Joel D. McKinney, Indiana Township, Allegheny County, Pa., assignors to Gulf Research & Development Company, Pittsburgh, Pa.
Filed Sept. 17, 1969, Ser. No. 858,585
Int. Cl. C10g 23/02
U.S. Cl. 208—216      6 Claims

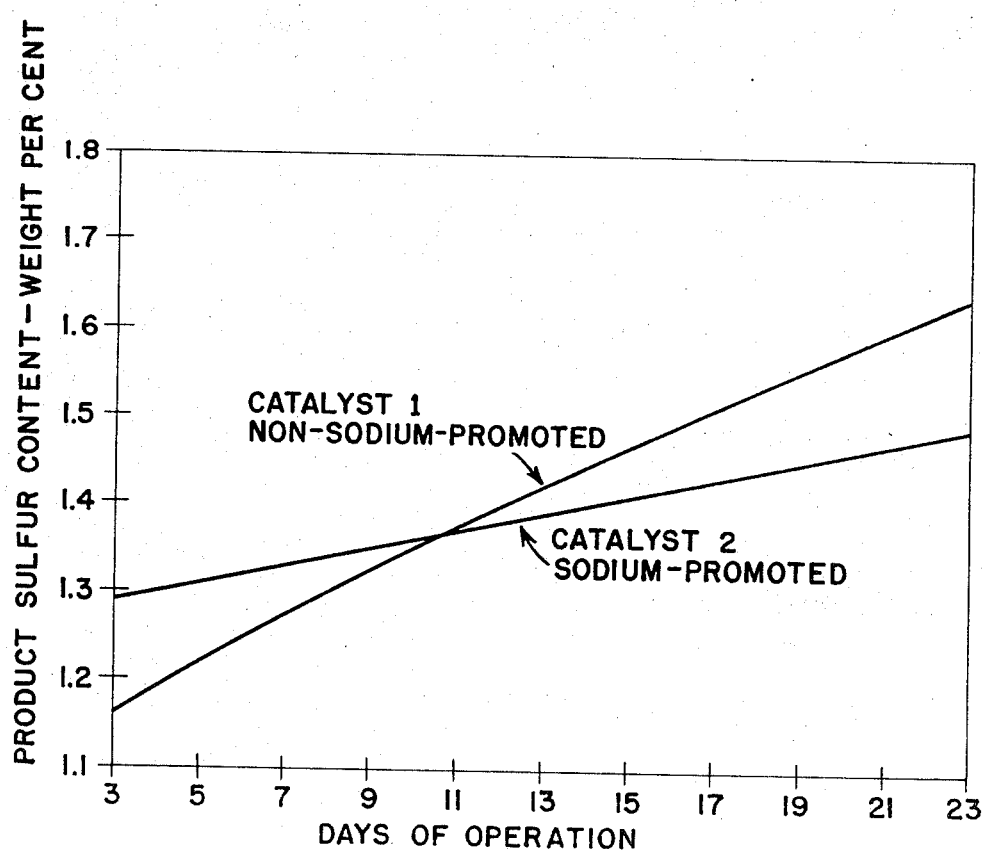

ABSTRACT OF THE DISCLOSURE

The hydrodesulfurization of a hydrocarbon oil with a catalyst comprising a supported Group VI and Group VIII metal is improved by sodium promotion of the catalyst. The improved effect is suprising because over an extended initial stage of the process the sodium acts as a catalyst poison and depresses catalyst activity. However, after a period of aging the hydrodesulfurization activity of the sodium-promoted catalyst emerges superior to that of the non-promoted catalyst. The superior activity of the aged sodium-promoted catalyst is inexplicable in view of the fact that the carbon, sulfur and metals laydown on the aged sodium-promoted catalyst is about as high as on the aged non-sodium-promoted catalyst.

---

The present invention relates to a process for the hydrodesulfurization of a hydrocarbon oil, especially a crude oil or a reduced crude oil, in the presence of a sodium, potassium or lithium promoted supported Group VI and Group VIII metal hydrodesulfurization catalyst. In a preferred embodiment of this invention substantially all or a large proportion of the catalyst particles have a diameter of between about $\frac{1}{20}$ and $\frac{1}{40}$ inch.

Although nickel-cobalt-molybdenum is the preferred active metals combination for the basic catalyst of this invention, i.e. the catalyst except for promotion with sodium, potassium or lithium, other combinations can be utilized such as cobalt-molybdenum, nickel-tungsten and nickel-molybdenum. Alumina is the preferred supporting material but other supports such as silica alumina and silica magnesia with low cracking activities may be used.

Hydrodesulfurization catalysts comprising supported Group VI and Group VIII metals, such as nickel-cobalt-molybdenum on alumina, having a particle size as small as the catalyst particles of the preferred embodiment of the present invention are described in copending Ser. No. 770,625, filed Oct. 25, 1968.

The charge to the process of this invention can be any sulfur-containing hydrocarbon oil, especially a full crude or a reduced crude containing substantially all of the residual asphaltenes of the full crude. The residual asphaltenes are deficient in hydrogen and comprise only about 10 percent of the charge oil but contain substantially all of the metallic components present in the crude, such as nickel and vanadium. Since the desulfurization catalyst has a greater activity for demetalization than for desulfurization, it removes nickel and vanadium from a charge stock more rapidly than it removes sulfur. These metals deposit most heavily on the outermost regions of the catalyst cross section and tend to reduce the desulfurization activity of the catalyst. Nickel and vanadium removal together with carbon deposited on the catalyst account for substantially the entire deactivation of the catalyst while sulfur, except for sulfur combined with vanadium and nickel on the catalyst, and nitrogen removal contribute very little to catalyst deactivation. Furthermore, the asphaltenes comprise the highest boiling fraction of the full crude and contain the largest molecules in the crude. These large molecules are the ones least able to penetrate catalyst pores and most likely to plug these pores. The present invention is particularly useful in the hydrodesulfurization of a full crude or a residual oil containing substantially the entire asphaltene fraction of the crude from which it is derived and which therefore contains 95 to 99 weight percent or more of the nickel and vanadium content of the full crude. The nickel, vanadium and sulfur content of the liquid charge can vary over a wide range. For example, nickel and vanadium can comprise 0.002 to 0.03 weight percent (20 to 300 parts per million) or more of the charge oil while sulfur can comprise about 2 to 6 weight percent or more of the charge oil. If an oil containing smaller quantities of nickel, vanadium and sulfur is processed, such as a furnace oil, considerably lower temperature conditions, pressures as low as 500 pounds per square inch, lower gas circulation rates and hydrogen of lower purity than required for treatment of a residual oil will suffice to produce a liquid product containing about 1 percent sulfur.

As the hydrodesulfurization reaction proceeds, nickel and vanadium removal from the charge tends to occur preferentially over sulfur removal. However, deposition of nickel and vanadium upon the catalyst results in a greater degree of catalyst deactivation than does sulfur removal because the removed metals deposit upon the catalyst whereas sulfur removed from the charge escapes as hydrogen sulfide gas. Low hydrodesulfurization temperatures tend to inhibit metal removal from the charge and thereby reduce catalyst deactivation. Since the hydrodesulfurization reaction is exothermic, the reactor can be quenched to maintain a reaction temperature as low as the small size of the preferred catalyst of this invention permits to obtain the desired degree of desulfurization in order to inhibit catalyst deactivation. Quenching is advantageously accomplished by dividing the total catalyst bed into a plurality of relatively small beds in series and injecting relatively cool hydrogen between the beds, as shown in the above-identified co-pending application.

The hydrodesulfurization process employs conventional reaction conditions such as, for example, a hydrogen partial pressure of 1,000 to 5,000 pounds per square inch, generally, 1,000 to 3,000 pounds per square inch, preferably, and 1,500 to 2,500 pounds per square inch most preferably. Reactor design limitations usually restrict inlet pressures under the conditions of the present invention to not more than 2,000, 2,500 or 3,000 p.s.i.g. It is the partial pressure of hydrogen rather than total reactor pressure which determines hydrodesulfurization activity. Therefore, the hydrogen stream should be as free of other gases as possible. Furthermore, since reactor design limitations restrict hydrogen inlet pressures, hydrogen pressure drop in the reactor should be held as low as possible.

The gas circulation rate can be between about 2,000 and 20,000 standard cubic feet per barrel, generally, or preferably about 3,000 to 10,000 standard cubic feet per barrel of gas preferably containing 85 percent or more of hydrogen. The mol ratio of hydrogen to oil can be between about 8:1 and 80:1. Reactor temperatures can range between about 650 and 900° F., generally and between about 680 and 800° F., preferably. The temperature should be low enough so that not more than about 10, 15 or 20 percent of the charge will be cracked to furnace oil or lighter. At temperatures approaching 800° F. the steel of the reactor walls rapidly loses strength and unless reactor wall thicknesses of 7 to 10 inches or more are utilized a temperature of about 800° F. constitutes a metallurgical limitation. The liquid hourly space velocity in each reactor of this invention can be between about 0.2 and 10, generally, between about 0.3 and 1 or 1.25, preferably, or between about 0.5 and 0.6 most preferably.

The base catalyst employed in the process is conventional and comprises sulfided Group VI and Group VIII metals on a support such as nickel-cobalt-molybdenum or cobalt-molybdenum on alumina. Basic hydrodesulfurization catalyst compositions suitable for use in the present invention are described in U.S. 2,880,171 and also in U.S. 3,383,301. The smallest diameter of the preferred catalyst particles of the present invention is broadly between about 1/20 and 1/40 inch, preferentially between 1/25 and 1/36 inch, and most preferably between about 1/29 and 1/34 inch. Particle sizes below this range would induce a pressure drop which is too great to make them practical. The catalyst can be prepared so that nearly all or at least about 92 or 96 percent of the particles are within this range. The catalyst can be in any suitable configuration in which the smallest particle diameter is within this range, such as roughly cubical, needle-shaped or round granules, spheres, cylindrically-shaped extrudates, etc. By smallest particle diameter we mean the smallest surface to surface dimension through the center or axis of the catalyst particle, regardless of the shape of the particle. The cylindrical extrudate form having a length between about 1/10 and 1/4 inch is highly suitable.

Since the asphaltene molecules which are hydrodesulfurized are large molecules and must enter and leave the pores of the catalyst without plugging the pores, in order to obtain good aging properties most of the pore volume of the preferred catalyst of this invention should be in pores above 50 A. in size. Advantageously 60 to 75 percent or more of the pore volume should be in pores of 50 A. or more. Most preferably, 80 to 85 percent or more of the pore volume should be in pores above 50 A. in size. Catalysts having smaller size pores have good initial activity but poor aging characteristics due to gradual plugging of the pores by the asphaltene molecules.

When the hydrodesulfurization catalysts described are treated with sodium and placed on-stream in a hydrodesulfurization process, the sodium is observed to poison the catalyst over an extended initial stage of the reaction during which the sulfur-removing ability of the catalyst is inferior to a non-sodium-promoted catalyst. However, unexpectedly, sodium promotion imparts highly superior aging characteristics to the catalyst so that the poisoning effect evident in the early stages of the reaction is overcome when later stages of the reaction are reached whereby a highly beneficial effect in sodium promotion becomes apparent in the aged catalyst. Since sodium promotion poisons the catalyst during early stages of use and a general poisoning effect due to sodium promotion is indicated, the subsequent advantageous effect due to sodium promotion which emerges with aging is highly unexpected. The late-appearing superior qualities of the sodium-promoted catalyst is doubly surprising on the basis of analysis of the aged catalyst. It would be expected that if the aged sodium-promoted catalyst possesses a greater activity for hydrodesulfurization than an aged non-sodium-promoted catalyst the greater activity could be accounted for by a smaller carbon, sulfur and metals laydown during use on the sodium-promoted catalyst as compared to the non-sodium-promoted catalyst. However, it was found that there was no significant difference in carbon, sulfur and metals deposition between the aged promoted and aged non-promoted catalysts so the difference in activity of the two catalysts is apparently not attributable to this effect. In fact, comparative tests were made in addition to the tests reported below wherein the relatively superior activity of an aged sodium-promoted catalyst appeared in spite of a greater laydown of carbon, sulfur and metals on the sodium-promoted catalyst than in the non-sodium-promoted catalyst.

While the 1/32 inch catalyst advantageously possesses more exposed hydrogenation sites per unit volume or unit weight of catalyst than larger size particles, the disadvantageous correlative of this fact is that the 1/32 inch catalyst has more acid sites exposed per unit volume or weight than larger size catalyst particles. Each acid site is a potential cracking locale which can diminish product yield and increase coke lay-down on the catalyst which, of course, will induce catalyst deactivation. Coke laydown could be severe during start-up when the catalyst is in a state of especially high activity. High initial catalyst activity is the reason start-up of a hydrodesulfurization reactor commonly occurs at reduced severity, i.e. at conditions of temperature and pressure lower than are subsequently employed. Similarly, the enhanced number of exposed acid sites per unit volume or weight of the 1/32 inch catalyst could cause more severe coke lay-down over the extended operating life of the catalyst. It would be expected that sodium treatment, by neutralizing the acid sites on the 1/32 inch catalyst, would reduce its cracking activity and thereby inhibit coke lay-down. However, the following tests unexpectedly show an aged 1/32 inch sodium-promoted catalyst experienced a greater coke laydown during extended use than an aged 1/32 inch non-sodium-promoted catalyst.

A 1/32 inch catalyst was impregnated with about one weight percent sodium to neutralize its acid sites. An alumina support prior to impregnation with nickel, cobalt and molybdenum was treated with aqueous sodium nitrate and then dried. It was subsequently impregnated with nickel, cobalt and molybdenum to produce the sodium-promoted catalyst of the following test. A satisfactory but somewhat inferior catalyst was prepared by treating NiCoMo impregnated alumina with aqueous NaOH, indicating that it is preferable to impregnate the alumina with sodium prior to addition of NiCoMo. While aqueous sodium nitrate and sodium hydroxide are satisfactory, sources of sodium such as sodium chloride or sodium sulfate would not be satisfactory because their anions would constitute catalyst poisons.

The NiCoMo+Na impregnated alumina support was formed as a 1/32 inch extrudate which was tested as a hydrodesulfurization catalyst against a similar but non-sodium-promoted 1/32 inch NiCoMo on alumina extrudate. Following is a description of the sodium- and non-sodium-promoted catalysts.

| | Catalyst | |
|---|---|---|
| | 1. NiCoMo on alumina | 2. Na promoted NiCoMo on alumina |
| Chemical analysis, weight percent: | | |
| Nickel | 0.5 | 0.5 |
| Cobalt | 1.0 | 1.0 |
| Molybdenum | 8.0 | 8.0 |
| Silicon | 0.27 | 0.27 |
| Sodium | 0.09 | 0.98 |
| Iron | 0.02 | 0.02 |
| Alumina | (¹) | (¹) |
| Physical inspections: | | |
| Compacted Density, g./cc. | 0.69 | 0.72 |
| Surface area, m.²/g. | 194 | 184 |
| Pore volume, cc./g. | 0.52 | 0.52 |
| Pore size distribution, percent of P.V.: | | |
| 100–300 A. radius | 14 | 14 |
| 50–100 A. radius | 50 | 54 |
| 30–50 A. radius | 28 | 26 |
| 7–30 A. radius | 8 | 6 |
| Surface acidity NH₃ adsorption, meq./g., ° F.: | | |
| 350 | 0.62 | 0.44 |
| 400 | 0.55 | 0.38 |
| 500 | 0.43 | 0.285 |
| 600 | 0.34 | 0.21 |
| 700 | 0.27 | 0.16 |
| 800 | 0.21 | 0.12 |
| 900 | 0.16 | 0.09 |

¹ Difference.

The non-sodium-promoted catalyst contained 0.09 weight percent of sodium. This is only an impurity amount and most commercial catalysts generally contain about this amount of sodium. However, the data presented below shows the complete non-equivalence of the 0.09 weight percent sodium as compared to the sodium-promoted catalyst containing 0.98 weight percent of sodium.

Regarding the ammonia adsorption data, it is noted that strongest acid sites, i.e. the acid sites that adsorb ammonia at the highest temperatures, are affected more by sodium treatment than the weak acid sites. The data shows that at 350° F. the sodium-treated catalyst adsorbed about two-thirds of the ammonia adsorbed by the non-treated catalyst at this same temperature. However, at 900° F. the sodium-treated catalyst adsorbed only about one-half of the ammonia adsorbed by the non-treated catalyst. The effect of sodium-promotion at elevated temperatures is more important than at lower temperatures because the hydrodesulfurization reaction occurs at elevated temperatures.

The figure illustrates the results of employing the two catalysts described above in hydrodesulfurization tests. Although, as stated above, a hydrodesulfurization operation with fresh catalyst is usually started-up at conditions of reduced severity, the tests illustrated in FIG. 1 were carried out at uniform severity throughout in order to accelerate catalyst aging for test purposes. The charge to each test was a blend of atmospheric residue containing 4.29 weight percent of sulfur, 76 p.p.m. of vanadium and 24 p.p.m. of nickel. Each test was carried out at a hydrogen partial pressure of 1825 p.s.i.a. and a temperature of 760° F.

The figure illustrates the unexpected results of this invention. While sodium-promotion was expected to inhibit cracking activity, it was not expected to inhibit hydrodesulfurization activity. However, the figure shows that the sodium acts as a catalyst poison to the hydrodesulfurization reaction in the early stages of the process. The sodium-promoted catalyst is initially inferior to the non-sodium-promoted catalyst in that it was initially incapable of reducing the sulfur content of the hydrocarbon to as low a level as the non-sodium-promoted catalyst. This initially low activity of the sodium-promoted catalyst would tend to induce an experimenter to conclude that sodium-promotion was generally deleterious to the hydrodesulfurization reaction. However, the figure shows that the aging characteristics of the sodium-promoted catalyst are far superior to the non-sodium-promoted catalyst so that after about 11 days on-stream the sodium-promoted catalyst matches and then subsequently and progressively far surpasses the sulfur-removing activity of the non-sodium-promoted catalyst.

Further surprising results of the tests illustrated in the figure are found in the following analyses of each of the catalysts tested after 23 days on-stream.

| | Catalyst | |
|---|---|---|
| | 1. NiCoMo on alumina | 2. Na promoted NiCoMo on alumina |
| Weight percent: | | |
| Carbon | 13.9 | 15.0 |
| Sulfur | 10.0 | 9.2 |
| Nickel | 1.4 | 1.2 |
| Vanadium | 5.0 | 4.4 |
| Total | 30.3 | 29.8 |

The above analyses of the used catalysts further illustrate the unexpected results of this invention. It would have been expected that the superior aging characteristics of the sodium-promoted catalyst was due to an inhibited carbon laydown on the catalyst because of a lower activity for cracking due to neutralization of acid sites. However, carbon deposition was actually slightly higher on the sodium-promoted-catalyst and when considering the total carbon, sulfur, nickel and vanadium deposition there was no significant difference between the sodium-promoted catalyst and the non-sodium-promoted catalyst. The used catalyst analyses show the apparent inexplicability of the superior hydrodesulfurization aging characteristics of the catalyst of this invention.

Sodium-promotion is advantageous for hydrodesulfurization catalysts regardless of catalyst particle size and the present invention is not limited to the preferred catalyst size disclosed above but applies to catalysts of any conventional size. The sodium level for catalysts of this invention should be at least about 0.5 weight percent to secure adequate promotion and can range up to about 1.5 or 2 weight percent. Any sodium level above this range which unduly obscures the surface of the catalyst and obstructs catalyst pores should be avoided. Potassium and lithium can be substituted for sodium in the catalysts of this invention, since these metals neutralize catalyst acid sites as does sodium.

We claim:

1. In a process for the hydrodesulfurization of a crude oil or a reduced crude oil which includes the steps of passing a mixture of 2,000 to 20,000 standard cubic feet per barrel of hydrogen and said oil through a bed of catalyst comprising Group VI and Group VIII metal on alumina promoted with at least about 0.5 percent per weight of a metal selected from the group consisting of sodium, potassium and lithium wherein said promotion metal has an initial adverse effect upon said hydrodesulfurization process, the invention comprising performing said process for more than 11 days at a liquid hourly space velocity between about 0.2 and 10 to age said catalyst and thereby provide high sulfur-removing activity in said process.

2. The process of claim 1 wherein the catalyst particles in said catalyst bed are between about $\frac{1}{20}$ and $\frac{1}{40}$ inch in diameter.

3. The process of claim 1 wherein the catalyst comprises nickel-cobalt-molybdenum on alumina promoted with between about 0.5 and 2 percent by weight of sodium.

4. The process of claim 1 wherein said promotion metal is sodium.

5. In a process for the hydrodesulfurization of a crude oil or a reduced crude oil containing the asphaltene fraction of the crude which includes the steps of passing a mixture of 2,000 to 20,000 standard cubic feet per barrel of hydrogen and said crude oil through a bed of nickel-cobalt-molybdenum on alumina catalyst promoted with between about 0.5 and 2 percent by weight of sodium, the catalyst particles in said catalyst bed being between about $\frac{1}{20}$ and $\frac{1}{40}$ inch in diameter, wherein said sodium has an initial adverse effect upon said hydrodesulfurization process, the invention comprising performing said process for more than 11 days at a liquid hourly space velocity between 0.2 and 10 to age said catalyst and thereby provide high sulfur-removing activity in said process.

6. The process of claim 1 wherein said crude oil or said reduced crude oil contains the asphaltene fraction of the crude.

References Cited

UNITED STATES PATENTS

| 2,697,683 | 12/1954 | Engel et al. | 208—216 |
| 3,112,257 | 11/1963 | Douwes et al. | 208—216 |

DELBERT E. GANTZ, Primary Examiner

G. J. CRASANAKIS, Assistant Examiner